UNITED STATES PATENT OFFICE.

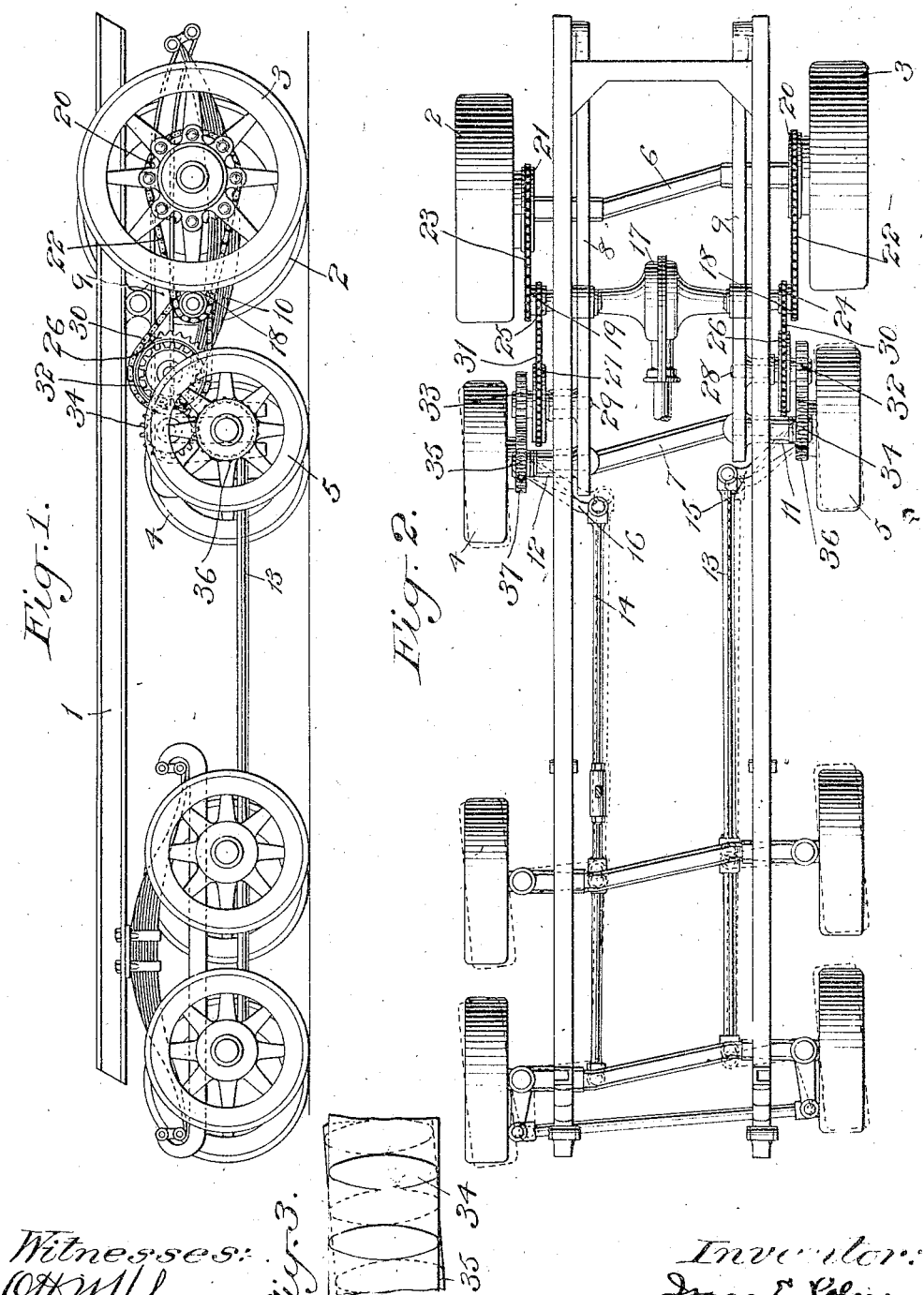

ISAAC E. PALMER, OF MIDDLETOWN, CONNECTICUT.

RUNNING-GEAR FOR VEHICLES.

1,009,336.

Specification of Letters Patent. Patented Nov. 21, 1911.

Application filed January 8, 1908. Serial No. 409,752.

*To all whom it may concern:*

Be it known that I, ISAAC E. PALMER, a citizen of the United States, and resident of Middletown, in the county of Middlesex and State of Connecticut, have invented a new and useful Improvement in Running-Gear for Vehicles, of which the following is a specification.

My invention relates to running gear for trackless power driven vehicles, with the object in view of providing increased traction and reducing the tendency to skid.

In the accompanying drawings, Figure 1 is a view in side elevation of the running gear embodying my invention. Fig. 2 is a top plan view of the same, and Fig. 3 is a view in detail showing the form of teeth on certain gear wheels.

My present invention contemplates a body frame supported at its forward end upon either a four-wheeled truck or a two-wheeled truck, as may be desired, the wheels of the forward truck being steering wheels, the body frame at its rear end being supported upon a truck movable independently of the body frame and provided with more than two supporting wheels. In the form of my invention here illustrated, the rear truck is provided with four supporting wheels and the forward truck with four supporting wheels.

The body frame is denoted by 1, and is supported upon a four-wheeled rear truck and a four-wheeled forward truck.

The rear truck has two pairs of driving wheels, one pair denoted by 2 and 3 and the other pair by 4 and 5. The wheels 2 and 3 are mounted out of transverse alinement on an axle denoted by 6, and the wheels 4 and 5 are also out-of transverse alinement and mounted on an axle 7. The axles 6 and 7 are secured to a truck frame comprising a pair of bars denoted by 8 and 9, resting on a pair of springs, one of the springs being shown in side elevation in Fig. 1, at 10, and in the present instance, located underneath the side rails of the body 1. The springs 10 are secured to the axle 6, and the axle 7 has connected to its opposite ends, stub axles mounted to swing forwardly and backwardly to tilt the wheels 4 and 5. These stub axles are denoted by 11 and 12, and may be secured to the axle 7 in any well known and approved form. These axles are
moved by means of steering rods 13, 14, leading forward from arms 15, 16, attached to the axles.

A divided drive shaft with its differential gear housed as is common in the art in a casing denoted by 17, is mounted in suitable bearings fixed to the bars 8 and 9, and carries on its ends sprocket wheels 18, 19, connected with sprocket wheels 20, 21, on the hubs of the larger driving wheels 2 and 3, by sprocket chains 22 and 23. The divided drive shaft also has on its ends, sprocket wheels 24, 25, connected with sprocket wheels 26, 27, stub shafts 28, 29, projecting from the bars 8 and 9 by means of sprocket chains 30, 31. The said stub shafts also have spur wheels 32, 33, mounted thereon and fixed to rotate with the sprocket wheels 26, 27, the said spur wheels 32, 33, gearing with spur wheels 34, 35, mounted on suitable bearings on the truck frame and located directly over gears 36, 37, the gears 34, 35, being partly broken away in Fig. 2, to show the gears 36, 37. Each gear wheel 34, 35, and its interengaging gear wheel 36, 37, on the hub of the tilting drive wheel is provided with teeth of elliptical cross section as shown in Fig 3, so that the wheels 4 and 5 will tilt in a horizontal plane while the teeth of the gears 34, 36, and 35, 37, rock the one on the other without cramping.

What I claim is:

In running gear for vehicles, the combination with front steering wheels, of a truck for supporting the rear of the vehicle, a truck wheel being arranged to tilt toward and away from the longitudinal axis of the vehicle, a drive shaft, a spur gear on the hub of said tilting wheel, a spur gear supported on the truck frame and intermeshing with the gear on the said hub, and intermediate gear for connecting the spur gear on the truck frame with the drive shaft, the said spur gear on the truck frame being arranged directly above the spur gear on the hub of said tilting wheel.

In testimony, that I claim the foregoing as my invention, I have signed my name in presence of two witnesses, this 4th day of January 1908.

ISAAC E. PALMER.

Witnesses:
CHARLES M. SAUER,
REUBEN M. BURR.